US012761191B2

(12) United States Patent
Watanabe

(10) Patent No.: US 12,761,191 B2
(45) Date of Patent: Oct. 13, 2026

(54) CHROMATOGRAPHIC CONTROL DEVICE, CHROMATOGRAPHIC SYSTEM, CHROMATOGRAPHIC CONTROL METHOD AND NON-TRANSITORY COMPUTER READABLE MEDIUM

(71) Applicant: SHIMADZU CORPORATION, Kyoto (JP)

(72) Inventor: Satoru Watanabe, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 1234 days.

(21) Appl. No.: 17/287,037

(22) PCT Filed: Oct. 26, 2018

(86) PCT No.: PCT/JP2018/039956
§ 371 (c)(1),
(2) Date: Apr. 20, 2021

(87) PCT Pub. No.: WO2020/084785
PCT Pub. Date: Apr. 30, 2020

(65) Prior Publication Data
US 2021/0382020 A1 Dec. 9, 2021

(51) Int. Cl.
*G01N 30/88* (2006.01)
*G01N 30/46* (2006.01)

(52) U.S. Cl.
CPC ........... *G01N 30/468* (2013.01); *G01N 30/88* (2013.01); *G01N 2030/8804* (2013.01)

(58) Field of Classification Search
CPC ................ G01N 30/468; G01N 30/88; G01N 2030/8804
See application file for complete search history.

(56) References Cited

U.S. PATENT DOCUMENTS 4,841,456 A * 6/1989 Hogan, Jr. ....... G01R 31/31903 702/119
5,813,015 A * 9/1998 Pascoe ................. G06F 3/0486 715/764
(Continued)

FOREIGN PATENT DOCUMENTS

JP 2008-224559 A 9/2008
WO WO-2015063886 A1 * 5/2015 ............ G01N 30/34

OTHER PUBLICATIONS

International Search Report for corresponding Application No. PCT/JP2018/039956, mailed Jan. 29, 2019.
(Continued)

*Primary Examiner* — John E Breene
*Assistant Examiner* — Alex T Devito
(74) *Attorney, Agent, or Firm* — Renner, Otto, Boisselle & Sklar, LLP

(57) ABSTRACT

A range of pH of a mobile phase that is usable for an analysis with use of each column is registered by a pH range registrar in association with identification information of each column. A pH of each mobile phase is registered by a pH registrar. A column to be used for an analysis is selected by a column selector. A chromatograph is controlled by an analysis controller such that a mobile phase having a registered pH that is out of a range of pH that is registered in association with a selected column is not supplied to the selected column. The chromatograph is controlled by the analysis controller such that an analysis is performed while a mobile phase having a registered pH that is in a range of pH that is registered in association with a selected column is supplied to the selected column.

8 Claims, 10 Drawing Sheets

(56) References Cited

U.S. PATENT DOCUMENTS

| | | | | | |
|---|---|---|---|---|---|
| 7,613,574 | B2 * | 11/2009 | Verseput | G06F 30/00 | 709/204 |
| 2002/0054383 | A1 * | 5/2002 | Sato | H04N 1/00063 | 358/504 |
| 2003/0167259 | A1 * | 9/2003 | Casson | C09D 11/037 | 707/999.005 |

OTHER PUBLICATIONS

Written Opinion for corresponding Application No. PCT/JP2018/039956, mailed Jan. 29, 2019 (partial English Machine Translation).

Office Action for corresponding JP Patent Application No. 2020-552494 dated Feb. 8, 2022, with English language machine translation.

Shim-pack Scepter LC Column (Catalogue), Shimadzu Corporation, Sep. 2018, with English Language Translation.

Office Action for corresponding Chinese Patent Application No. 201880098680.1 dated Jul. 17, 2023, with English language machine translation.

Decision of Refusal in corresponding Chinese Patent Application No. 201880098680.1 dated Jan. 10, 2024, with English language machine translation.

* cited by examiner

CHROMATOGRAPHIC CONTROL DEVICE, CHROMATOGRAPHIC SYSTEM, CHROMATOGRAPHIC CONTROL METHOD AND NON-TRANSITORY COMPUTER READABLE MEDIUM

TECHNICAL FIELD

The present invention relates to a chromatographic control device, a chromatographic system, a chromatographic control method and a non-transitory computer readable medium storing a chromatographic control program.

BACKGROUND ART

Chromatographs have been known as devices that separate substances included in samples into different components. For example, in a liquid chromatograph described in Patent Document 1, a sample to be analyzed is introduced into a separation column (hereinafter simply referred to as a column) by an autosampler. Further, an eluent (mobile phase) is supplied to the column by an eluent pump. The sample that has been introduced into the column is eluted into components based on a difference in chemical property or composition and detected by a detector.

Patent Document 1 JP 2008-224559 A

SUMMARY OF INVENTION

Technical Problem

In a chromatograph, it is necessary to appropriately select each of various analysis conditions such as a column filler, a dimension of column, a temperature of column, a type of a mobile phase, a pH of a mobile phase and a flow rate of a mobile phase. Therefore, a user performs an analysis of a sample in regard to each of combinations of various analysis conditions and searches for an appropriate combination of analysis conditions. However, a column may be damaged by application of a load to the column depending on an analysis condition.

An object of the present invention is to provide a chromatographic control device, a chromatographic system, a chromatographic control method and a non-transitory computer readable medium storing a chromatographic control program that enable prevention of damage to a column.

Solution to Problem (1) A chromatographic control device according to one aspect of the present invention that controls a chromatograph for performing an analysis of a sample by using any of a plurality of columns and any of a plurality of mobile phases, includes a pH range registrar that registers a range of pH having a pH value of a mobile phase that is usable for an analysis with use of each column in association with identification information of each column, a pH registrar that registers a pH of each mobile phase, a column selector that selects a column to be used for an analysis, and an analysis controller controlling the chromatograph such that a mobile phase, having a pH that is registered in the pH registrar and out of a range of pH that is registered in the pH range registrar in association with a column selected by the column selector, is not supplied to the selected column, and controlling the chromatograph such that an analysis is performed while a mobile phase, having a pH that is registered in the pH range registrar and in a range of pH that is registered in the pH range registrar in association with the selected column, is supplied to the selected column.

In this chromatographic control device, the range of pH of a mobile phase that is usable for an analysis with use of each column is registered in association with identification of each column, and a pH of each mobile phase is registered. A column to be used for an analysis is selected. Here, the chromatograph is controlled such that the mobile phase having a registered pH that is out of a range of pH that is registered in association with the selected column is not supplied to the selected column. On the other hand, the chromatograph is controlled such that an analysis is performed while a mobile phase having a registered pH that is in the range of pH that is registered in association with the selected column is supplied to the selected column.

With this configuration, since the registered pH is out of the range of pH that is registered in association with the selected column, a mobile phase that is unusable for an analysis with use of each column is prevented from being supplied to the column. Thus, the column can be prevented from being damaged.

(2) The chromatographic control device may further include a pH range receiver to which a range of pH of a mobile phase that is usable for an analysis with use of each column is input based on a user operation, wherein the pH range registrar may register a range of pH that is received by the pH range receiver in association with each column. In this case, the user can easily input a range of pH of a mobile phase that is usable for an analysis with use of each column in association with identification information of each column by operating the pH range receiver.

(3) The chromatographic control device may further include a pH receiver to which a pH of each mobile phase is input based on a user operation, wherein the pH registrar may register a pH received by the pH receiver in regard to each mobile phase. In this case, the user can easily input a pH of each mobile phase by operating the pH receiver.

(4) The chromatographic control device may further include a mobile phase selector that automatically and sequentially selects the plurality of mobile phases as mobile phases to be used for an analysis, and an evaluator, wherein the column selector may be configured to automatically and sequentially select the plurality of columns as columns to be used for an analysis, and the analysis controller may control the chromatograph such that a mobile phase, having a pH that is registered in the pH registrar and out of a range of pH that is registered in the pH range registrar in association with a column selected by the column selector, is not supplied to the selected column and a mobile phase, having a pH that is registered in the pH registrar and in a range of pH that is registered in the pH range registrar in association with the selected column is supplied to the selected column, and the evaluator may evaluate a result of an analysis performed by the analysis controller.

With this configuration, a result of an analysis corresponding to a combination of a column and a mobile phase is acquired, and a result of the analysis is evaluated. Thus, the user can easily determine an optimal combination of a column and a mobile phase for the analysis of the sample. Further, even in a case where an analysis is performed while combinations of a column and a mobile phase are changed, a mobile phase that is unusable for an analysis with use of each column is prevented from being supplied to the column. Thus, the column can be prevented from being damaged.

(5) The chromatographic control device may further include a creator that creates a batch file including combinations of each column and each mobile phase, wherein the analysis controller may control the chromatograph such that an analysis is performed in accordance with the combinations of a column and a mobile phase included in the batch file, and the creator may create the batch file such that a combination of a column and a mobile phase having a pH that is registered in the pH register and out of a range of pH that is registered in the pH range registrar is not included in the batch file. In this case, in accordance with the batch file, the analysis controller can easily control the chromatograph such that a mobile phase having a registered pH that is out of a pH range that is registered in association with any column is not supplied to the column.

(6) A chromatographic system according to another aspect of the present invention includes a chromatograph, and the above-mentioned chromatographic control device, wherein the chromatograph includes a plurality of columns, a mobile phase supplier that supplies any mobile phase out of a plurality of mobile phases to any column out of the plurality of columns, a sample supplier that supplies a sample to the column, and a detector that detects a sample that has passed through the column.

In this chromatographic system, any mobile phase and a sample are supplied to any column out of the plurality of columns, and a sample that has passed through the column is detected, by the chromatograph. The chromatograph is controlled by the chromatographic control device such that an analysis is performed with use of a selected column. Here, a mobile phase that is unusable for an analysis with use of the selected column is not supplied to the column. Thus, the column can be prevented from being damaged.

(7) A chromatographic control method according to yet another aspect of the present invention for controlling a chromatograph that performs an analysis of a sample by using any of a plurality of columns and any of a plurality of mobile phases, includes the steps of registering a range of pH having a pH value of a mobile phase that is usable for an analysis with use of each column in association with identification information of each column, registering a pH of each mobile phase, selecting a column to be used for an analysis, and controlling the chromatograph such that a mobile phase, having a registered pH that is out of a range of pH that is registered in association with a selected column is not supplied to the selected column, and controlling the chromatograph such that an analysis is performed while a mobile phase, having a registered pH that is in a range of pH that is registered in association with the selected column, is supplied to the selected column.

With this chromatographic control method, a mobile phase that is unusable for an analysis with use of a selected column is not supplied to the column. Thus, the column can be prevented from being damaged.

(8) A non-transitory computer readable medium storing a chromatographic control program according to yet another aspect of the present invention controls a chromatograph for performing an analysis of a sample by using any of a plurality of columns and any of a plurality of mobile phases, and the chromatographic control program causes a processing device to register a range of pH having a pH value of a mobile phase that is usable for an analysis with use of each column in association with identification information of each column, register a pH of each mobile phase, select a column to be used for an analysis, and control the chromatograph such that a mobile phase, having a registered pH that is out of a range of pH that is registered in association with a selected column, is not supplied to the selected column, and controlling the chromatograph such that an analysis is performed while a mobile phase, having a registered pH that is in a range of pH that is registered in association with the selected column, is supplied to the selected column.

With this chromatographic control program, a mobile phase that is unusable for an analysis with use of a selected column is not supplied to the column. Thus, the column can be prevented from being damaged. It is possible to provide the chromatographic control program in the form of being stored in a storage medium.

Advantageous Effects of Invention

With the present invention, a column can be prevented from being damaged.

DESCRIPTION OF EMBODIMENTS

(1) Configuration of Chromatographic System

Figure 1:
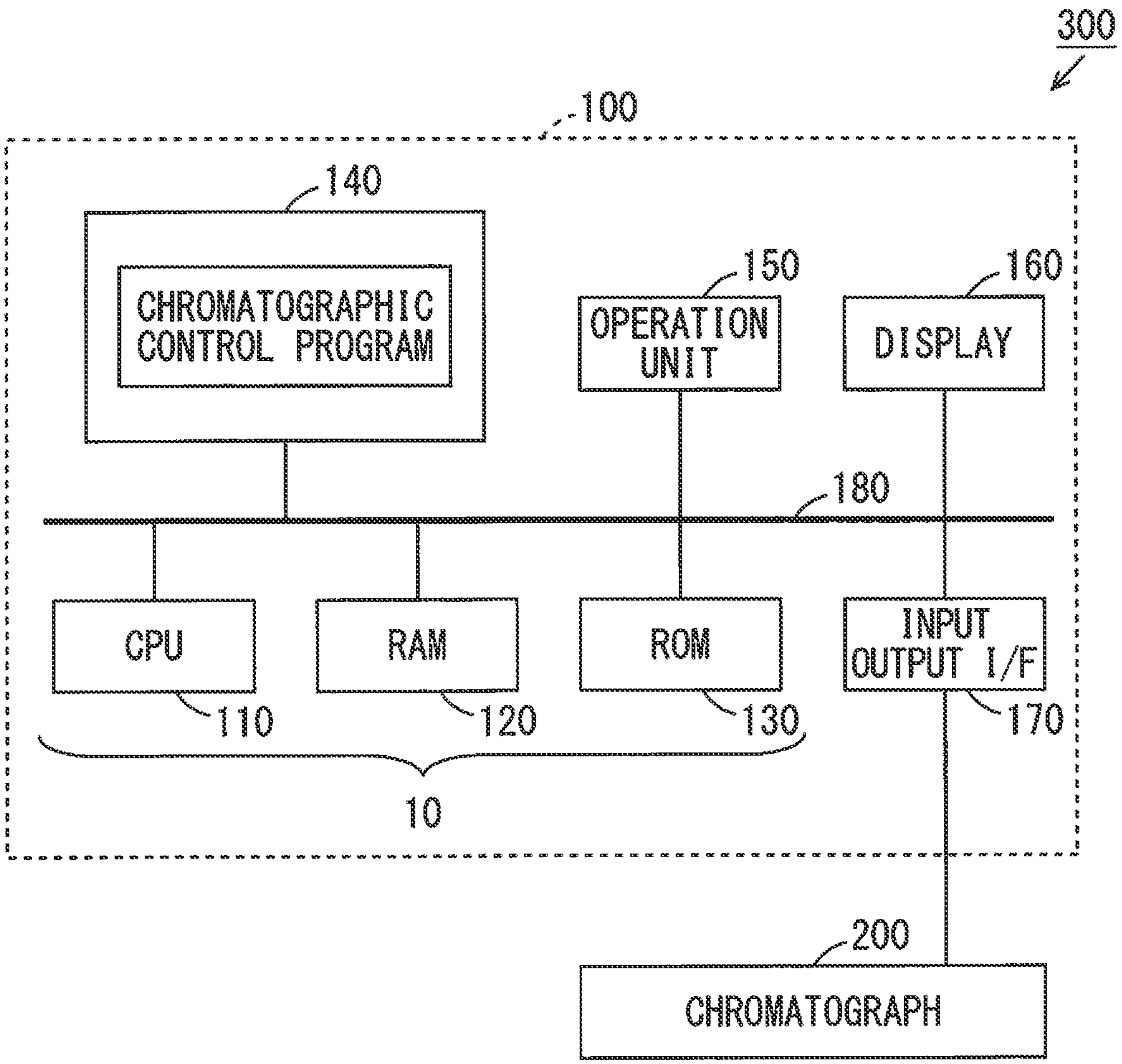
FIG. 1 is a diagram showing the configuration of a chromatographic system according to one embodiment of the present invention.

A chromatographic control device, a chromatographic system, a chromatographic control method and a non-transitory computer readable medium storing a chromatographic control program according to embodiments of the present invention will be described below in detail with reference to the drawings. FIG. 1 is a diagram showing the configuration of the chromatographic system according to one embodiment of the present invention. As shown in FIG. 1, the chromatographic system 300 includes a processing device 100 and a chromatograph 200.

The processing device 100 is constituted by a CPU (Central Processing Unit) 110, a RAM (Random Access Memory) 120, a ROM (Read Only Memory) 130, a storage 140, an operation unit 150, a display 160 and an input output I/F (interface) 170. The CPU 110, the RAM 120, the ROM 130, the storage 140, the operation unit 150, the display 160 and the input output I/F 170 are connected to a bus 180. The CPU 110, the RAM 120 and the ROM 130 constitute a chromatographic control device 10.

The RAM 120 is used as a work area for the CPU 110. A system program is stored in the ROM 130. The storage 140 includes a storage medium such as a hard disc or a semiconductor memory. The chromatographic control program for controlling the chromatograph 200 is stored in the storage 140. The chromatographic control program may be stored in a storage medium different from the storage 140. The CPU 110 executes the chromatographic control program stored in the storage 140 or the like on the RAM 120, whereby a chromatographic control process, described below, is executed.

The operation unit 150 is an input device such as a keyboard, a mouse or a touch panel. The display 160 is a display device such as a liquid crystal display device and displays an execution screen for the chromatographic control process to be executed by the chromatographic control device 10, and so on. The input output I/F 170 is connected to the chromatograph 200.

Figure 2:
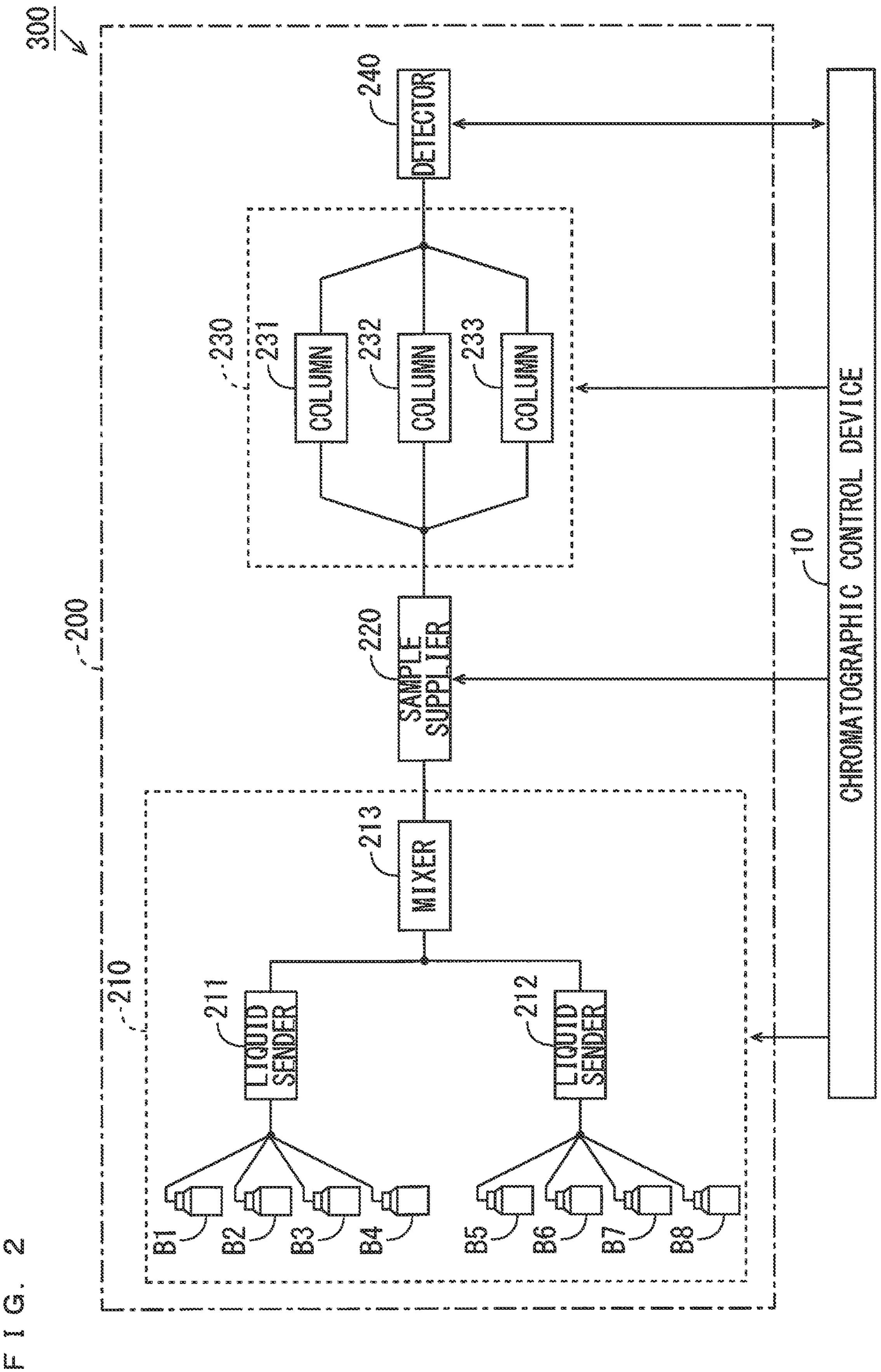
FIG. 2 is a schematic diagram showing the configuration of a chromatograph.

FIG. 2 is a schematic diagram showing the configuration of the chromatograph 200. As shown in FIG. 2, in the present embodiment, the chromatograph 200 is a liquid chromatograph and includes a mobile phase supplier 210, a sample supplier 220, a column oven 230 and a detector 240.

The mobile phase supplier 210 includes two liquid senders 211, 212 and a mixer 213. Further, a plurality (eight in the example of FIG. 2) of chemical bottles B1 to B8 are provided in the mobile phase supplier 210. In the chemical bottles B1 to B4, respectively different aqueous solutions are contained as chemical liquids. In the chemical bottles B5 to B8, respectively different organic solvents are contained as chemical liquids.

The liquid senders 211, 212 are liquid sending pumps, for example. The liquid sender 211 pumps a chemical liquid contained in any one or more chemical bottles selected by a switch valve (not shown) from among the chemical bottles B1 to B4. The liquid sender 212 pumps a chemical liquid contained in any one or more chemical bottles selected by a switch valve (not shown) from among the chemical bottles B5 to B8. A degassing device (not shown) is provided between the liquid sender 211 and the chemical bottles B1 to B4, and a degassing device (not shown) is provided between the liquid sender 212 and the chemical bottles B5 to B8.

The mixer 213 is a gradient mixer, for example. The mixer 213 generates various mobile phases by mixing a chemical liquid pumped by the liquid sender 211 with a chemical liquid pumped by the liquid sender 212 at any ratio, thereby supplying the generated mobile phases. The sample supplier 220 is an injector, for example. The sample supplier 220 selectively introduces a sample to be analyzed together with a mobile phase supplied by the mobile phase supplier 210 to any column selected by a switch valve (not shown) from among columns 231 to 233, described below.

The temperature in the column oven 230 is adjusted to a predetermined constant temperature. The column oven 230 houses the plurality (three in the present example) of columns 231, 232, 233. Each of the columns 231 to 233 separates an introduced sample into components based on differences in chemical property or composition. The detector 240 detects components into which a sample is separated by each of the columns 231 to 233.

The chromatographic control device 10 controls the chromatograph 200 such that an analysis of a sample is performed while combinations of one of the columns 231 to 233 and a mobile phase are changed. Thus, the combination of analysis conditions for appropriately analyzing a desired sample can be searched. Such search for a combination of analysis conditions is referred to as method scouting. The configuration of the chromatographic control device 10 will be described below.

(2) Configuration of Chromatographic Control Device

Figure 3:
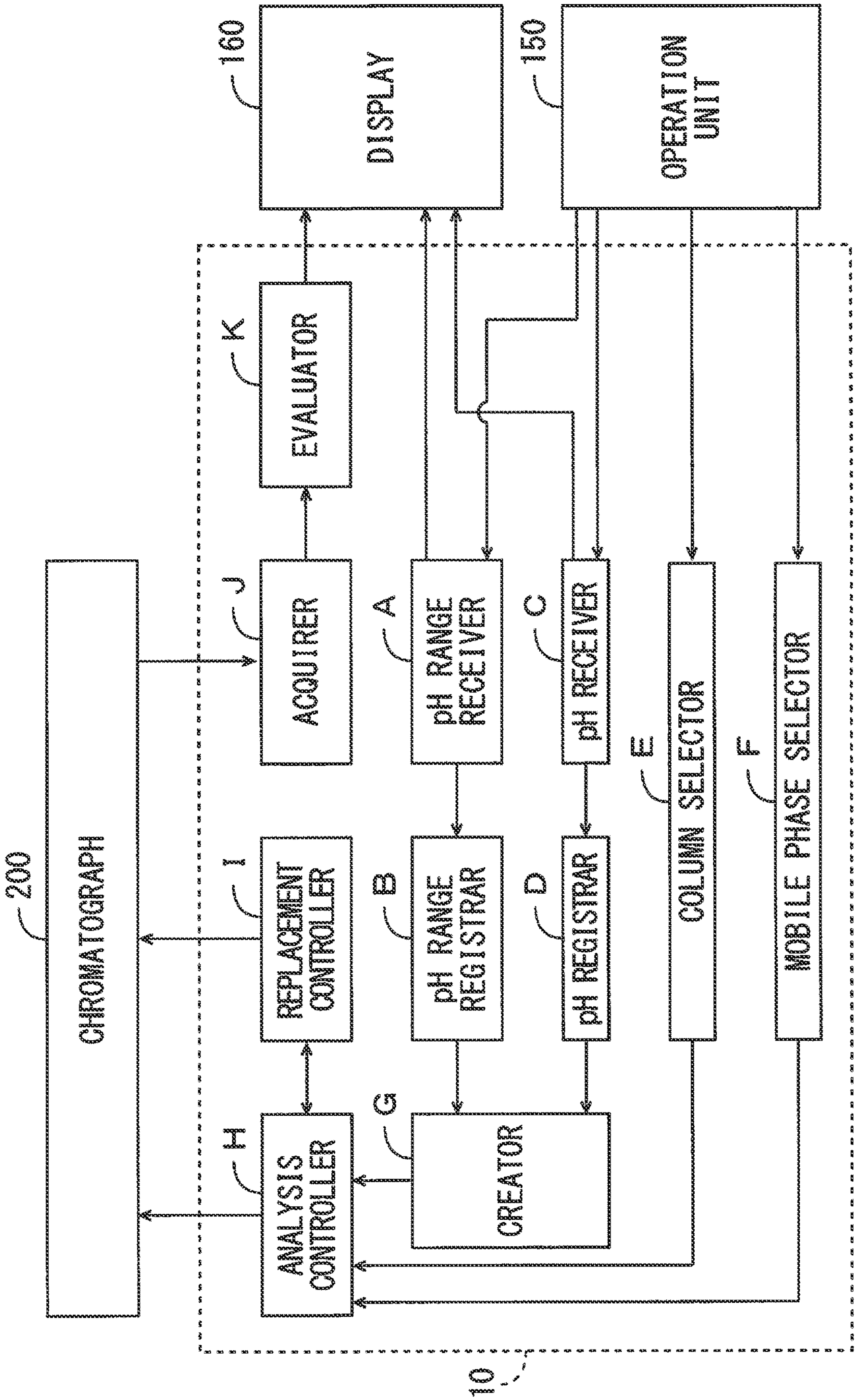
FIG. 3 is a diagram showing the configuration of a chromatographic control device.

FIG. 3 is a diagram showing the configuration of the chromatographic control device 10. As shown in FIG. 3, the chromatographic control device 10 includes a pH range receiver A, a pH range registrar B, a pH receiver C, a pH registrar D, a column selector E, a mobile phase selector F, a creator G, an analysis controller H, a replacement controller I, an acquirer J and an evaluator K as functions. The CPU 110 of FIG. 1 executes the chromatographic control program stored in the storage 140 or the like, whereby the functions of the chromatographic control device 10 are implemented. Part or all of the functions of the chromatographic control device 10 may be implemented by hardware such as an electronic circuit.

The pH range receiver A causes the display 160 to display a column registration screen in which a range of pH of a mobile phase that is usable in an analysis with use of each of the columns 231 to 233 of FIG. 2 is input in association with the identification information of each of the columns 231 to 233. Further, a range of pH of a mobile phase that is usable for an analysis with use of each of the columns 231 to 233 is input to the pH range receiver A from the operation unit 150 in association with the identification information of each of the columns 231 to 233.

Figure 4:
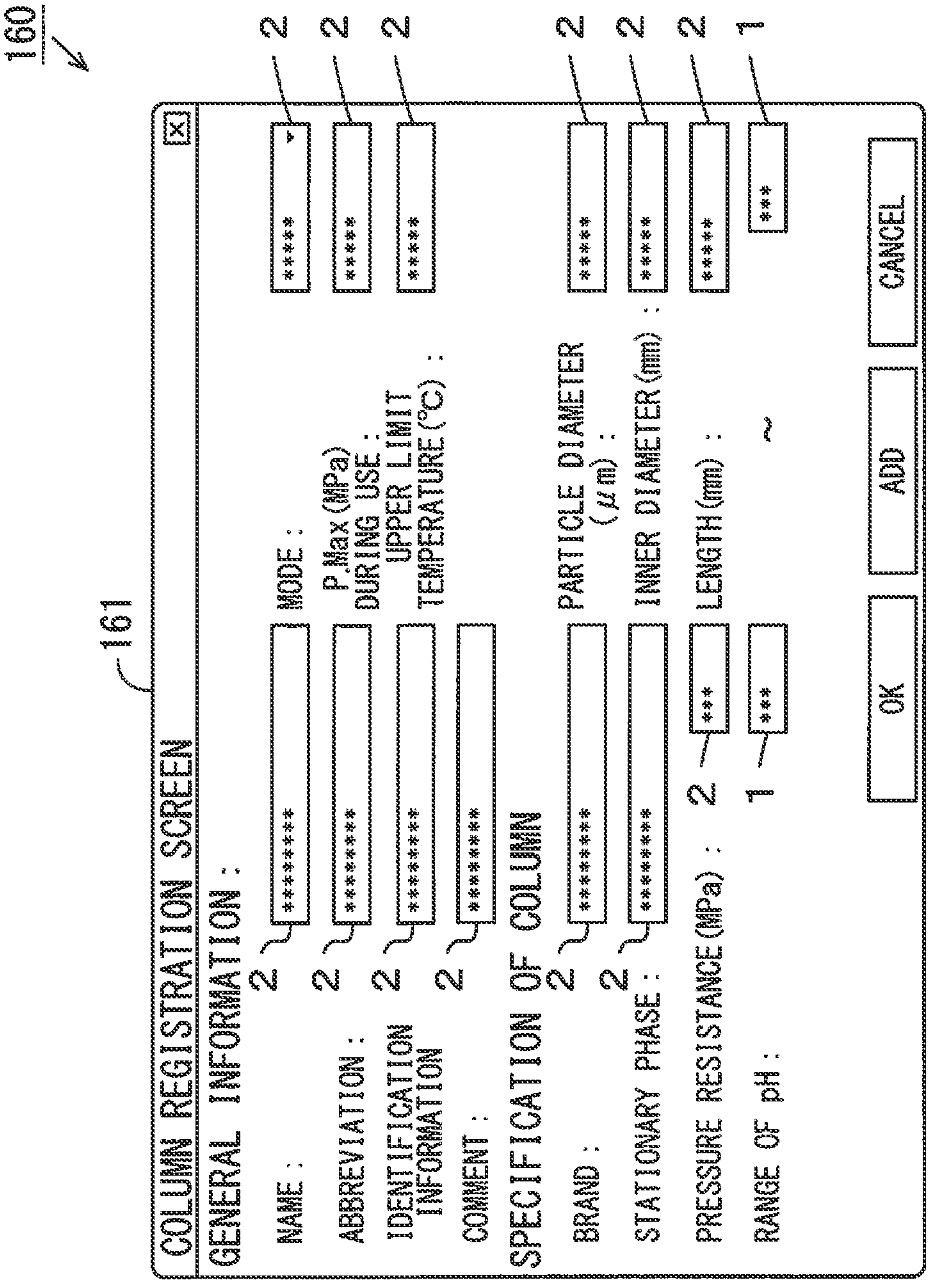
FIG. 4 is a diagram showing one example of a column registration screen displayed in a display.

FIG. 4 is a diagram showing one example of the column registration screen displayed in the display 160. As shown in FIG. 4, the column registration screen 161 includes a plurality of information input portions 1, 2. Each of the information input portions 1, 2 is a field in which a character string is to be input or a pull-down menu. The user can input a range of pH of a mobile phase for an analysis with use of each of the columns 231 to 233 by performing an operation in regard to the information input portions 1 using the operation unit 150. Further, the user can input the identification information of each of the columns 231 to 233 (a name of column, a brand, a stationary phase, pressure resistance, a particle diameter of a column filler, an inner diameter of column, a length of column or the like in the present example) by performing an operation in regard to any information input portions 2 using the operation unit 150.

The pH range registrar B registers a pH of a mobile phase that has been input to the pH range receiver A as a range of pH of a mobile phase that is usable for an analysis with use of a column in association with the column specified by the identification information input to the pH range receiver A.

The pH receiver C causes the display 160 to display a mobile phase registration screen for receiving input of a pH of each mobile phase that is used for an analysis. Further, a pH of each mobile phase is input from the operation unit 150 to the pH receiver C. A mobile phase used for an analysis includes each chemical liquid contained in any of the chemical bottles B1 to B8. A chemical liquid generated by blending chemical liquids contained in the chemical bottles B1 to B4 or a chemical liquid generated by blending chemical liquids contained in the chemical bottles B5 to B8 can be used as a mobile phase. Further, a liquid mixture of a chemical liquid contained in any of the chemical bottles B1 to B4 and a chemical liquid contained in any of the chemical bottles B5 to B8 can be used as a mobile phase.

Figure 5:
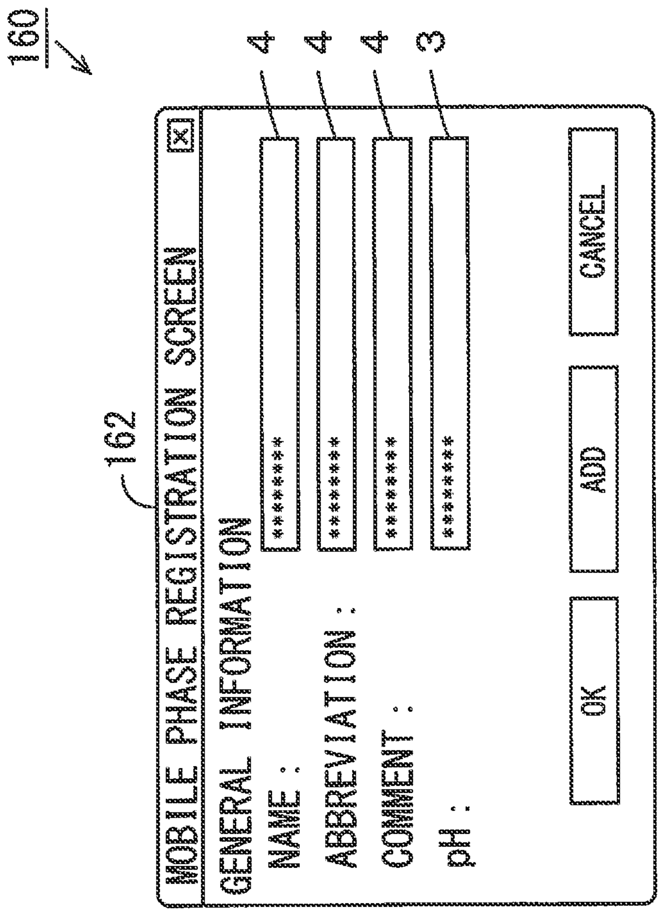
FIG. 5 is a diagram showing one example of a mobile phase registration screen displayed in the display.

FIG. 5 is a diagram showing one example of the mobile phase registration screen displayed in the display 160. As shown in FIG. 5, the mobile phase registration screen 162 includes a plurality of information input portions 3, 4. Each of the information input portions 3, 4 is a field in which a character string is to be input or a pull-down menu. The user can input a pH of each mobile phase by performing an operation in regard to an information input portion 3 using the operation unit 150. Further, the user can input the name or the like of a mobile phase by performing an operation in regard to each information input portion 4 using the operation unit 150.

Figure 6:
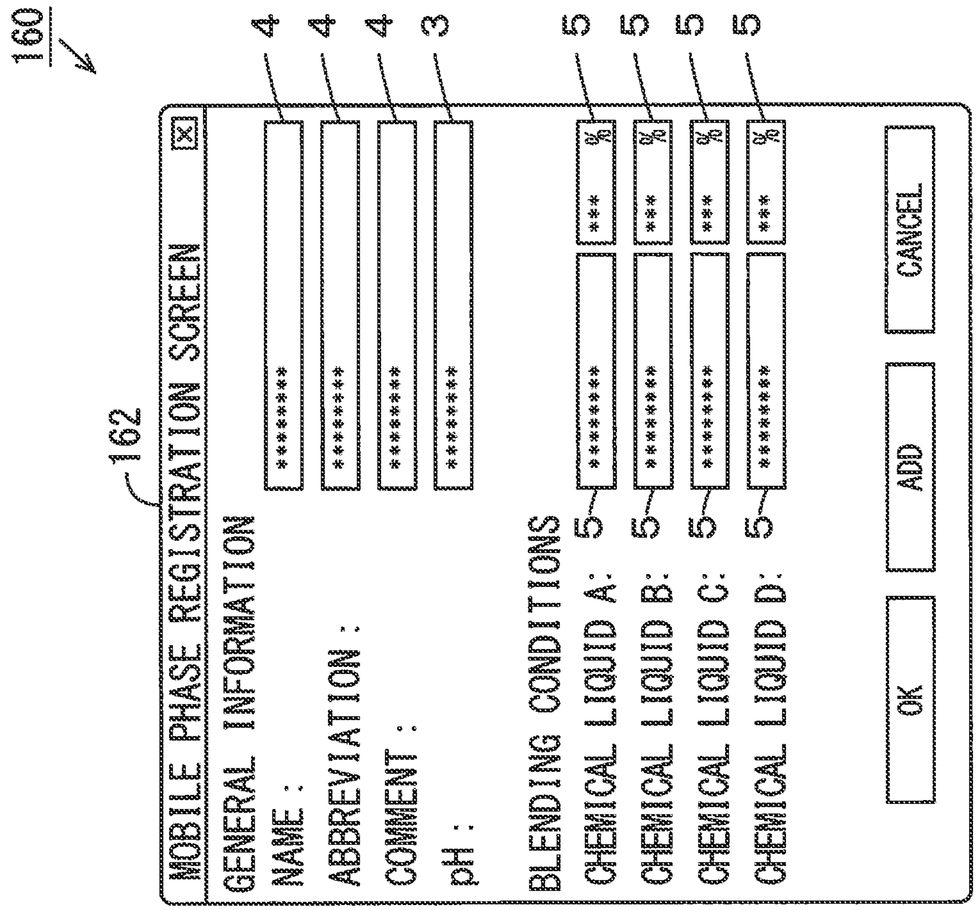
FIG. 6 is a diagram showing another example of the mobile phase registration screen displayed in the display.

FIG. 6 is a diagram showing another example of the mobile phase registration screen 162 displayed in the display 160. In the example of FIG. 6, the mobile phase registration screen 162 further includes a plurality of information input portions 5. Each of the information input portions 5 is a field in which a character string is to be input or a pull-down menu. The name and a blend ratio of each chemical liquid in a case where a plurality of chemical liquids are blended can be input in each of the plurality of information input portions 5. The user can input a pH of a mobile phase, the name of a mobile phase, and the name and a blend ratio of each chemical liquid by performing an operation in regard to each of the information input portions 3 to 5 using the operation unit 150.

The pH registrar D registers a pH that is input to the pH receiver C in regard to a mobile phase specified by a name and a blend ratio of each chemical liquid in the mobile phase and so on.

The column selector E selects any column out of the columns 231 to 233 based on an instruction provided by the operation unit 150. The user can designate a desired column from among the columns 231 to 233 by operating the operation unit 150. Further, the column selector E automatically and sequentially selects the plurality of columns 231 to 233 as columns to be used for an analysis during a method scouting process, described below.

The mobile phase selector F selects a mobile phase to be used for an analysis based on an instruction provided by the operation unit 150. The user can designate any liquid that can be supplied by the mobile phase supplier 210 as a mobile phase to be used for an analysis by operating the operation unit 150. Further, the mobile phase selector F automatically and sequentially selects a plurality of mobile phases as mobile phases to be used for an analysis during the method scouting process, described below.

The creator G creates a batch file for performing an analysis of a sample using various combinations of one of the columns 231 to 233 and a mobile phase. Here, in a case where a pH of any mobile phase that is registered by the pH registrar D is not in a range of pH that is registered in association with identification information of any column by the pH range registrar B, the mobile phase may put a burden on the column. Therefore, the creator G removes the combination of the mobile phase and the column from the batch file.

The analysis controller H controls the chromatograph 200 such that an analysis of a sample is performed while a mobile phase selected by the mobile phase selector F is supplied to a column selected by the column selector E. Further, during the below-mentioned method scouting process, the analysis controller H controls the chromatograph 200 such that an analysis of a sample is performed while combinations of one of the columns 341 to 344 and a mobile phase are changed, based on a column selected by the column selector E, a mobile phase selected by the mobile phase selector F and a batch file created by the creator G. In these cases, a mobile phase having a registered pH that is out of the range of pH that is registered in association with a column out of the columns 231 to 233 is not supplied to the column out of the columns 231 to 233.

Immediately after a mobile phase to be used for an analysis is changed by the analysis controller H, the mobile phase before the mobile phase is changed remains in a flow path of the chromatograph 200 including the columns 231 to 233. Therefore, in a case where a next analysis is performed immediately after a mobile phase is changed, a result of accurate analysis in regard to the mobile phase cannot be obtained. As such, in a case where a mobile phase to be used for an analysis is changed, the replacement controller I controls the chromatograph 200 such that a mobile phase before the mobile phase is changed remaining in the flow path is replaced with a mobile phase after the mobile phase is changed. A next analysis in regard to the mobile phase after the mobile phase is changed by the analysis controller H is performed after the behavior of the replacement controller I.

The acquirer J acquires a result of detection of components of a sample by the chromatograph 200, and generates a chromatogram representing the relationship between the retention period of time of each component and the detection intensity by processing the acquired result of detection. The evaluator K evaluates the quality of a chromatogram based on the separation of the components represented by the chromatogram generated by the acquirer J. Further, the evaluator K causes the display 160 to display a result of evaluation of the chromatogram and a combination of analysis conditions for generation of the chromatogram in association with each other.

The user can identify an optimal combination of analysis conditions by viewing a result of evaluation displayed in the display 160. In the display 160, results of evaluation of all of the generated chromatograms may be displayed, results of evaluation of chromatograms having a certain degree of quality or higher may be displayed or only a result of evaluation of a chromatogram having the highest degree of quality may be displayed. In a case where the results of evaluation of all of the chromatograms are displayed, the results of evaluation may be displayed such that the results of evaluation of chromatograms having a certain degree of quality or higher can be identified, or the results of evaluation may be displayed in a descending order of the degree of quality of the chromatograms.

(3) Chromatographic Control Process

Figure 7:
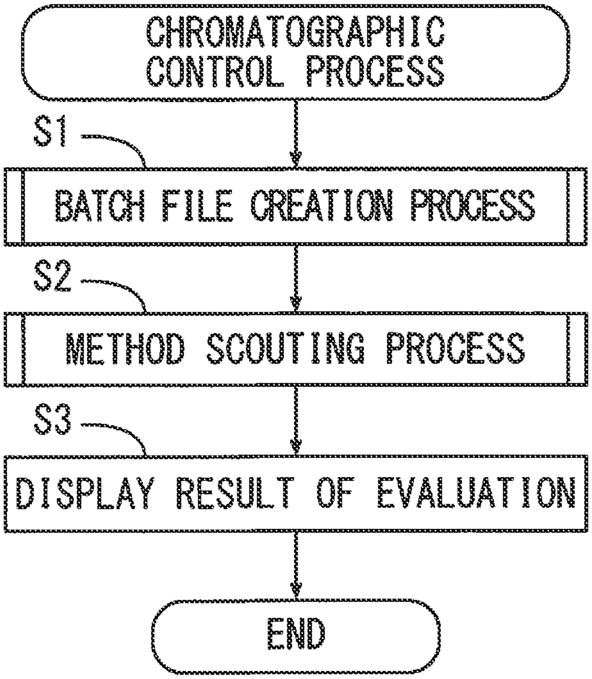
FIG. 7 is a flowchart showing the algorithm of a chromatographic control process executed by a chromatographic control program.

FIG. 7 is a flowchart showing the algorithm of the chromatographic control process executed by the chromatographic control program. In the chromatographic control process, a batch file creation of FIG. 8, described below, is executed (step S1). A batch file creation process is a process of creating a batch file for performing an analysis of a sample using various combinations of one of the columns 231 to 233 and a mobile phase.

Thereafter, the method scouting process of FIG. 9, described below, is executed based on a batch file created in the step S1 (step S2). The method scouting process is a process of performing an analysis of a sample while changing combinations of one of the columns 231 to 233 and a mobile phase and evaluating a chromatogram in regard to each combination. After the method scouting process of the step S2 is executed, the evaluator K causes the display 160 to display a result of evaluation in an analysis process (step S3) and ends the chromatographic control process.

(4) Batch File Creation Process

Figure 8:
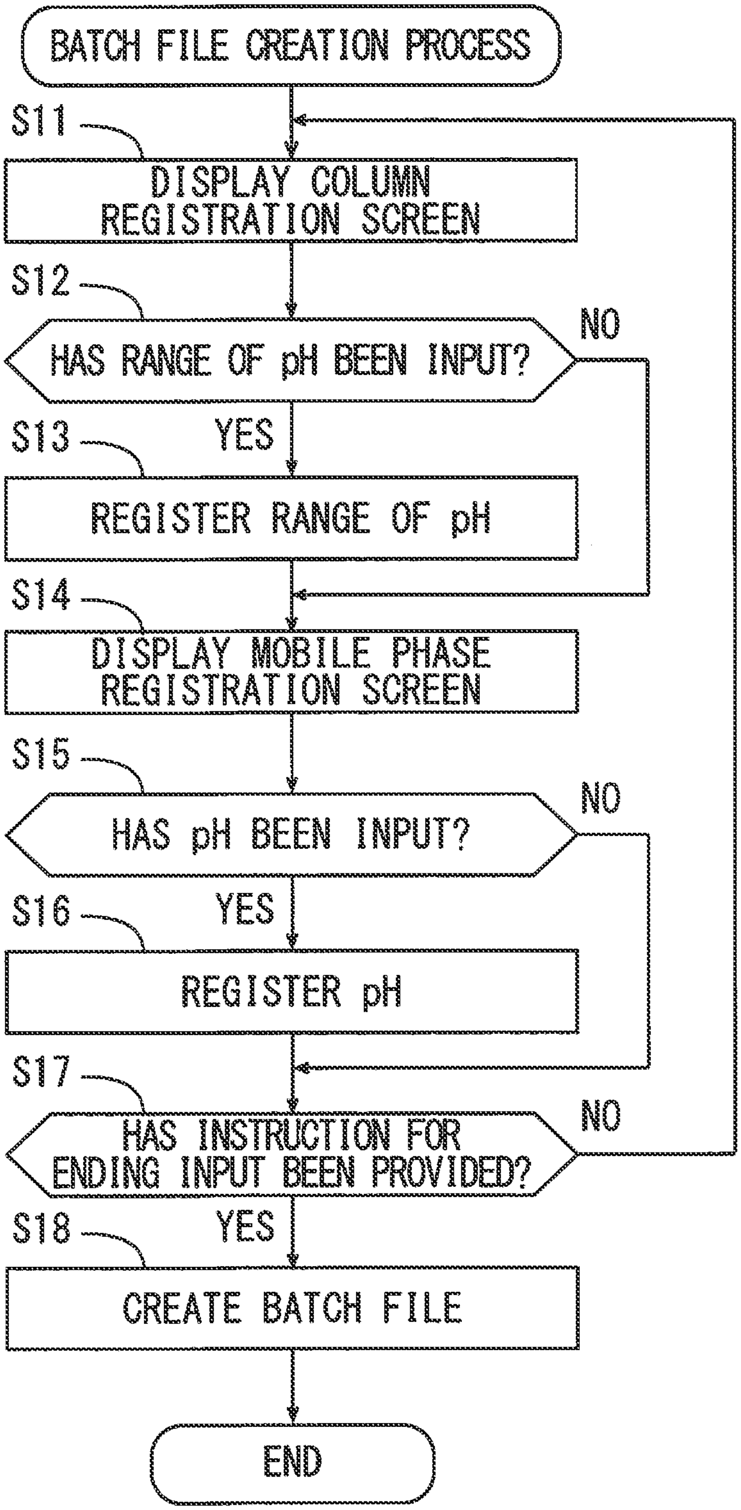
FIG. 8 is a flowchart showing the algorithm of a batch file creation process in the chromatographic control process of FIG. 7.

FIG. 8 is a flowchart showing the algorithm of the batch file creation process in the chromatographic control process of FIG. 7. In the batch file creation process, the pH range receiver A causes the display 160 to display the column registration screen 161 (step S11).

Next, the pH range receiver A determines whether a range of pH of a mobile phase has been input in association with the identification information of any of the columns 231 to 233 (step S12). The user can input a range of pH of a mobile phase in association with any of the columns 231 to 233 by operating the operation unit 150 in the column registration screen 161. In a case where a range of pH of a mobile phase is not input, the pH range receiver A proceeds to the step S14. In a case where a range of pH of a mobile phase is input, the pH range registrar B registers the input range of pH of the mobile phase in association with the column (step S13) and proceeds to the step S14.

In the step S14, the pH receiver C causes the display 160 to display the mobile phase registration screen 162 (step S14). Next, the pH receiver C determines whether a pH has been input in regard to any mobile phase (step S15). The user can input a pH of any mobile phase by operating the operation unit 150 in the mobile phase registration screen 162. In a case where a pH is not input, the pH receiver C proceeds to the step S17. In a case where a pH is input, the pH registrar D registers the input pH of a mobile phase (step S16) and proceeds to the step S17.

In the step S17, the creator G determines whether an instruction for ending input has been provided (step S17). The user can provide an instruction for ending input by operating the operation unit 150. In a case where an instruction for ending input is not provided, the creator G returns to the step S11. The steps S11 to S17 are repeated until the user inputs the ranges of pH of a mobile phase in association with all of the columns 231 to 233 and inputs pHs of all of the mobile phases and provides an instruction for ending input.

In a case where an instruction for ending input is provided, the creator G creates a batch file for performing an analysis of a sample using various combinations of one of the columns 231 to 233 and a mobile phase (step S18). Here, in a case where the pH that is registered in association with any mobile phase in the step S16 is out of the range of pH that is registered in association with the identification information of any column in the step S13, a batch file is created such that a combination of the mobile phase and the column is removed from the analysis procedure. That is, the creator G selects all combinations of a selectable column and a selectable mobile phase in order. In a case where a pH that is registered in association with a selected mobile phase satisfies a condition in regard to a range of pH that is registered in association with a selected column, the combination of the selected column and the mobile phase is registered in the batch file. In a case where a pH that is registered in association with a selected mobile phase does not satisfy a condition in regard to a range of pH that is registered in association with a selected column, the combination of the selected column and the mobile phase is prevented from being registered in the batch file.

(5) Method Scouting Process

Figure 9:
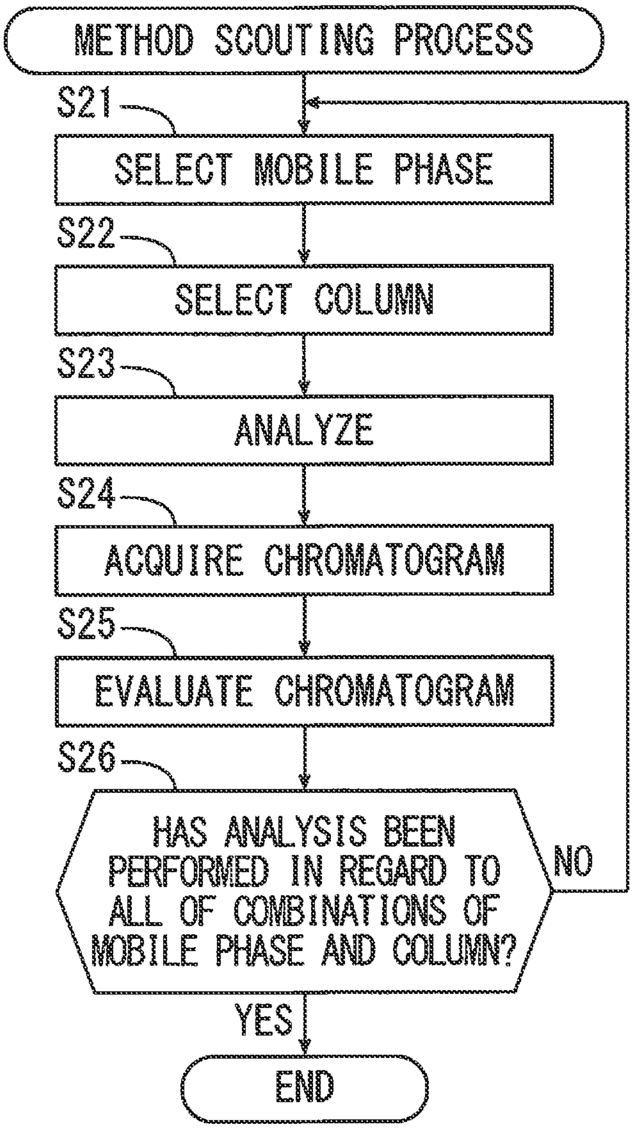
FIG. 9 is a flowchart showing one example of the algorithm of a method scouting process in the chromatographic control process of FIG. 7.

FIG. 9 is a flowchart showing one example of the algorithm of the method scouting process in the chromatographic control process of FIG. 7. In the method scouting process of FIG. 9, the first combination of a mobile phase and a column in the batch file created in the batch file creation process of FIG. 8 is selected, whereby the mobile phase selector F selects the mobile phase (step S21), and the column selector E selects the column (step S22).

Next, the analysis controller H controls the chromatograph 200 such that an analysis of a sample to be analyzed is performed (step S23). In the analysis, the mobile phase selected in the step S21 is supplied to the column selected in the step S22. The acquirer J acquires a result of detection of components of the sample by the chromatograph 200 in the step S23 and acquires a chromatogram by processing the acquired result of detection (step S24). The evaluator K evaluates the quality of the chromatogram acquired in the step S24 (step S25).

Thereafter, the analysis controller H determines whether an analysis has been performed in regard to all of the combinations of a mobile phase and a columns in the batch file (step S26). In a case where an analysis is not performed in regard to all of the combinations, the analysis controller H returns to the step S21. In this case, the next combination of a mobile phase and a column in the batch file is selected, and the steps S21 to S26 are repeated until an analysis is performed in regard to all of the combinations of a mobile phase and a column. In a case where an analysis is performed in regard to all of the combinations of a mobile phase and a column, the analysis controller H ends the method scouting process.

In a case where a mobile phase used for an analysis is changed when the process returns to the step S21 from the step S26, the replacement controller I controls the chromatograph 200 such that a mobile phase before the mobile phase is changed remaining in the flow path of the chromatograph 200 is replaced with a mobile phase after the mobile phase is changed. The mobile phase is replaced by supply of the mobile phase after the mobile phase is changed for a predetermined period of time to the flow path or supply of a predetermined volume of the mobile phase after the mobile phase is changed to the flow path.

(6) Effects

The chromatographic system 300 according to the present embodiment includes the chromatographic control device 10 and the chromatograph 200. In the chromatograph 200, any of a plurality of mobile phases is supplied to any of the columns 231 to 233 by the mobile phase supplier 210. Further, a sample is supplied to the same column out of the columns 231 to 233 by the sample supplier 220. The sample that has passed through the column out of the columns 231 to 233 is detected by the detector 240.

In the chromatographic control device 10, a range of pH of a mobile phase that is usable for an analysis with use of each of the columns 231 to 233 is registered by the pH range registrar B in association with the identification information of each of the columns 231 to 233. Further, a pH of each mobile phase is registered by the pH registrar D. One of the columns 231 to 233 to be used for an analysis is selected by the column selector E.

Here, the chromatograph 200 is controlled by the analysis controller H such that a mobile phase having a registered pH that is out of a range of pH that is registered in association with a selected column is not supplied to the selected column. On the other hand, the chromatograph 200 is controlled by the analysis controller H such that an analysis is performed while a mobile phase having a registered pH that is in a range of pH that is registered in association with a selected column is supplied to the selected column.

In this case, since a registered pH is out of a range of pH that is registered in association with a selected column out of the columns 231 to 233, an unusable mobile phase is prevented from being supplied to the selected column out of the columns 231 to 233 for an analysis with use of the selected column out of the columns 231 to 233. Thus, the column can be prevented from being damaged.

Further, the plurality of columns 231 to 233 are selected automatically and sequentially by the column selector E as columns to be used for an analysis, and a plurality of mobile phases are selected automatically and sequentially by the mobile phase selector F as mobile phases to be used for the analysis. A result of an analysis corresponding to a combination of a column and a mobile phase is acquired by the acquirer J and evaluated by the evaluator K. Thus, the user can easily determine an optimal combination of a column and a mobile phase for the analysis of the sample.

(7) Other Embodiments (a) While the chromatographic control device 10 includes the evaluator K in the above-mentioned embodiment, the present invention is not limited to this. In a case where the user determines the quality of a chromatogram by viewing the chromatogram, the chromatographic control device 10 does not have to include the evaluator K. In this case, the step S3 of FIG. 7 and the step S25 of FIG. 9 are not executed.

(b) While the chromatograph 200 is a liquid chromatograph in the above-mentioned embodiment, the present invention is not limited to this. The chromatograph 200 may be another chromatograph such as a supercritical chromatograph.

Figure 10:
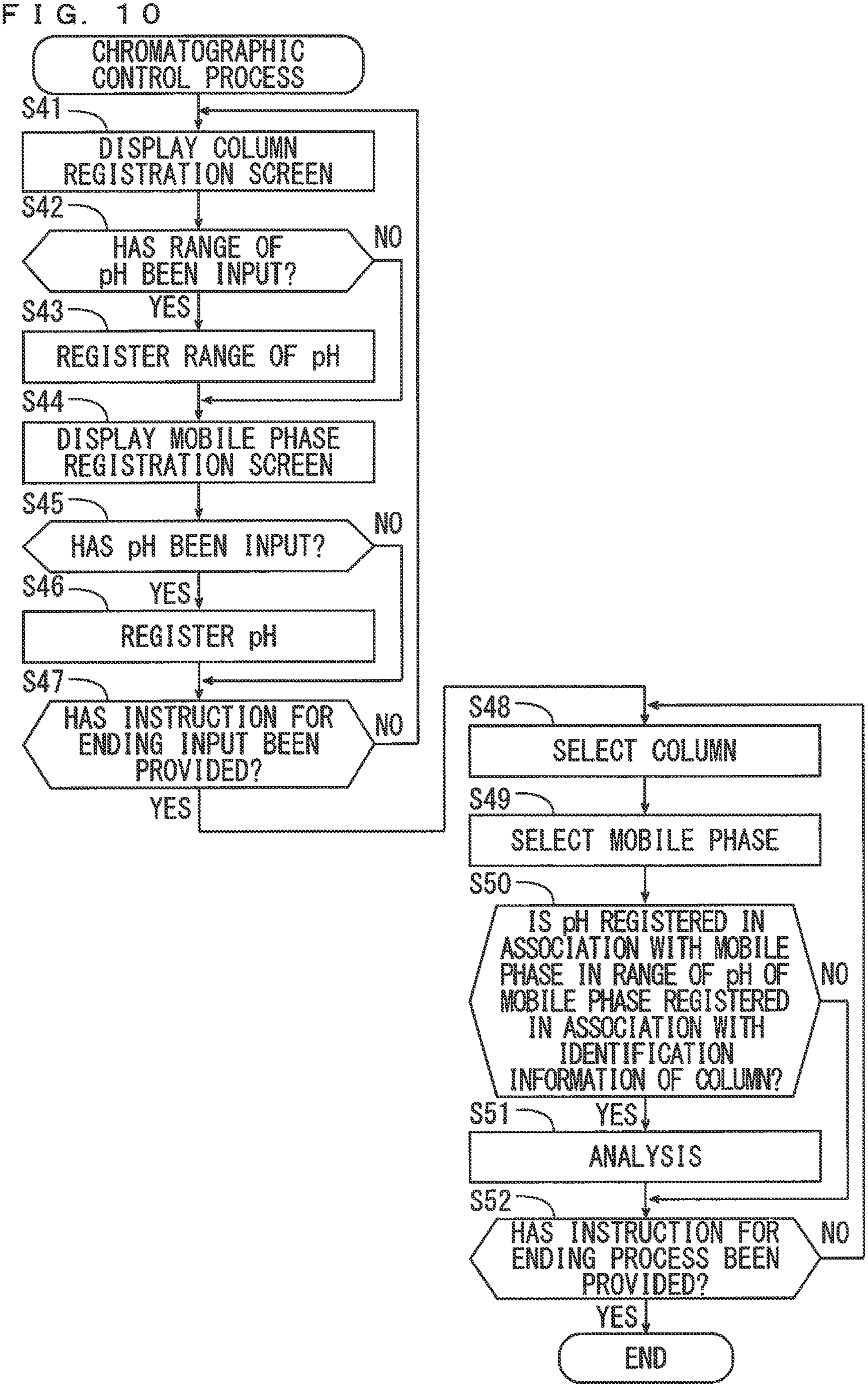
FIG. 10 is a flowchart showing the algorithm of another chromatographic control process executed by the chromatographic control program.

(c) While the chromatographic control device 10 executes the method scouting process in the above-mentioned embodiment, the present invention is not limited to this. FIG. 10 is a flowchart showing the algorithm of another chromatographic control process executed by the chromatographic control program. In the chromatographic control process of FIG. 10, the steps S41 to S47 respectively similar to the steps S11 to S17 in the batch file creation process of FIG. 8 are executed.

Thereafter, the column selector E selects any column from among the columns 231 to 233 based on an instruction provided by the operation unit 150 (step S48). Further, the mobile phase selector F selects any mobile phase from among a plurality of mobile phases based on an instruction provided by the operation unit 150 (step S49). The user can designate a desired column from among the columns 231 to 233 and a desired mobile phase by operating the operation unit 150. The steps S48 may be executed before the step S49 or the step S49 may be executed before the step S48.

The analysis controller H determines whether the pH that is registered in association with the mobile phase selected in the step S49 is in the range of pH that is registered in association with the identification information of the column selected in the step S48 (step S50). In a case where the pH that is registered in association with the mobile phase is in the range of pH of the mobile phase that is registered in association with the identification information of the column, the analysis controller H controls the chromatograph 200 such that an analysis of a sample to be analyzed is performed (step S51). In the analysis, the mobile phase selected in the step S49 is supplied to the column selected in the step S48. Thereafter, the analysis controller H proceeds to the step S52.

On the other hand, in a case where the pH that is registered in association with the mobile phase is not in the range of pH of the mobile phase that is registered in association with the identification information of the column in the step S50, the pH that is registered in association with the mobile phase is out of the range of pH of the mobile phase that is registered in association with the identification information of the column. In this case, the analysis controller H proceeds to the step S52 without performing an analysis. Thus, a mobile phase having a pH that is out of a range of pH that is registered in association with a column is prevented from being supplied to the column.

In the step S52, the analysis controller H determines whether an instruction for ending the chromatographic control process has been provided (step S52). The user can provide an instruction for ending the chromatographic control process by operating the operation unit 150. In a case where an instruction for ending the chromatographic control process is not provided, the analysis controller H returns to the step S48. The steps S48 to S52 are repeated until an instruction for ending the chromatographic control process is provided. In a case where an instruction for ending the chromatographic control process is provided, the analysis controller H ends the chromatographic control process.

In the steps S48 to S50 of FIG. 10, in the screen in which the user selects a column and a mobile phase, a combination of a column and a mobile phase having a pH that is out of a range of pH that is registered in association with the identification information of the column may be prevented from being displayed.

The invention claimed is:

1. A chromatographic control device that controls a chromatograph for performing an analysis of a sample by using any of a plurality of columns and any of a plurality of mobile phases, comprising:

a pH range registrar that registers a range of pH of a mobile phase that is usable for an analysis with use of each column in association with identification information of each column;

a pH registrar that registers a pH of each mobile phase;

a column selector that selects a column to be used for an analysis;

an analysis controller controlling the chromatograph such that a mobile phase, having a pH that is registered in the pH registrar and out of a range of pH that is registered in the pH range registrar in association with a column selected by the column selector, is not supplied to the selected column, and controlling the chromatograph such that an analysis is performed while a mobile phase, having a pH that is registered in the pH registrar and in a range of pH that is registered in the pH range registrar in association with the selected column, is supplied to the selected column; and a creator that creates a batch file including combinations of each column and each mobile phase, wherein the analysis controller controls the chromatograph such that an analysis is performed in accordance with the combinations of a column and a mobile phase included in the batch file, and the creator creates the batch file such that a combination of a column and a mobile phase having a pH that is registered in the pH register and out of a range of pH that is registered in the pH range registrar is not included in the batch file, and wherein the creator removes from the batch file the combination of the column and the mobile phase having the pH that is registered in the pH registrar and is out of the range of the pH registered in the pH range registrar.

2. The chromatographic control device according to claim 1, further comprising a pH range receiver to which a range of pH of a mobile phase that is usable for an analysis with use of each column is input based on a user operation, wherein the pH range registrar registers a range of pH that is received by the pH range receiver in association with each column.

3. The chromatographic control device according to claim 2, further comprising a pH receiver to which a pH of each mobile phase is input based on a user operation, wherein the pH registrar registers a pH received by the pH receiver in regard to each mobile phase.

4. The chromatographic control device according to claim 1, further comprising:

a mobile phase selector that automatically and sequentially selects the plurality of mobile phases as mobile phases to be used for an analysis; and an evaluator, wherein the column selector is configured to automatically and sequentially select the plurality of columns as columns to be used for an analysis, and the analysis controller controls the chromatograph such that a mobile phase, having a pH that is registered in the pH registrar and out of a range of pH that is registered in the pH range registrar in association with a column selected by the column selector, is not supplied to the selected column and a mobile phase, having a pH that is registered in the pH registrar and in a range of pH that is registered in the pH range registrar in association with the selected column is supplied to the selected column, and the evaluator evaluates a result of an analysis performed by the analysis controller.

5. A chromatographic system comprising:

a chromatograph; and the chromatographic control device according to claim 1, wherein the chromatograph includes a plurality of columns, a mobile phase supplier that supplies any mobile phase out of a plurality of mobile phases to any column out of the plurality of columns, a sample supplier that supplies a sample to the column, and a detector that detects a sample that has passed through the column.

6. The chromatographic control device according to claim 1, wherein the creator additionally selects all combinations of a selectable column and a selectable mobile phase in order by:

registering the combination of the selected column and the selected mobile phase in the batch file when a pH registered in association with the selected mobile phase satisfies a condition with respect to a range of pH registered in association with the selected column, and preventing the combination of the selected column and the selected mobile phase from being registered in the batch file when the pH registered in association with the selected mobile phase does not satisfy the condition with respect to the range of pH registered in association with the selected column.

7. A chromatographic control method for controlling a chromatograph that performs an analysis of a sample by using any of a plurality of columns and any of a plurality of mobile phases, including:

registering a range of pH of a mobile phase that is usable for an analysis with use of each column in association with identification information of each column;

registering a pH of each mobile phase;

selecting a column to be used for an analysis;

controlling the chromatograph such that a mobile phase, having a registered pH that is out of a range of pH that is registered in association with a selected column is not supplied to the selected column, and controlling the chromatograph such that an analysis is performed while a mobile phase, having a registered pH that is in a range of pH that is registered in association with the selected column, is supplied to the selected column; and creating a batch file including combinations of each column and each mobile phase, wherein the controlling the chromatograph includes controlling the chromatograph such that an analysis is performed in accordance with the combinations of a column and a mobile phase included in the batch file, and the creating a batch file includes creating the batch file such that a combination of a column and a mobile phase having a registered pH that is out of a range of pH that is registered is not included in the batch file, and removing from the batch file the combination of the column and the mobile phase having the pH that is registered in the pH registrar and is out of the range of the pH registered in the pH range registrar.

8. A non-transitory computer readable medium storing a chromatographic control program that controls a chromatograph for performing an analysis of a sample by using any of a plurality of columns and any of a plurality of mobile phases, the chromatographic control program causing a processing device to perform processes of:

registering a range of pH of a mobile phase that is usable for an analysis with use of each column in association with identification information of each column;

registering a pH of each mobile phase;

selecting a column to be used for an analysis;

controlling the chromatograph such that a mobile phase, having a registered pH that is out of a range of pH that is registered in association with a selected column, is not supplied to the selected column, and controlling the chromatograph such that an analysis is performed while a mobile phase, having a registered pH that is in a range of pH that is registered in association with the selected column, is supplied to the selected column; and creating a batch file including combinations of each column and each mobile phase, wherein the process of controlling the chromatograph includes controlling the chromatograph such that an analysis is performed in accordance with the combinations of a column and a mobile phase included in the batch file, and the process of creating a batch file includes creating the batch file such that a combination of a column and a mobile phase having a registered pH that is out of a range of pH that is registered is not included in the batch file, and removing from the batch file the combination of the column and the mobile phase having the pH that is registered in the pH registrar and is out of the range of the pH registered in the pH range registrar.

* * * * *